United States Patent
Maute et al.

(10) Patent No.: US 9,387,570 B2
(45) Date of Patent: Jul. 12, 2016

(54) POWER TOOL BRAKING DEVICE

(71) Applicant: Robert Bosch GmbH, Stuttgart (DE)

(72) Inventors: Joerg Maute, Sindelfingen (DE);
Florian Esenwein, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 174 days.

(21) Appl. No.: 14/159,214

(22) Filed: Jan. 20, 2014

(65) Prior Publication Data

US 2014/0206265 A1    Jul. 24, 2014

(30) Foreign Application Priority Data

Jan. 21, 2013  (DE) .......................... 10 2013 200 867

(51) Int. Cl.
| | |
|---|---|
| *B24B 41/04* | (2006.01) |
| *B24B 23/02* | (2006.01) |
| *F16D 55/02* | (2006.01) |
| *B24B 47/26* | (2006.01) |
| *F16D 59/00* | (2006.01) |
| *B23Q 11/00* | (2006.01) |

(52) U.S. Cl.
CPC ............... *B24B 41/04* (2013.01); *B24B 23/028* (2013.01); *B24B 47/26* (2013.01); *F16D 55/02* (2013.01); *F16D 59/00* (2013.01); *B23Q 11/0092* (2013.01)

(58) Field of Classification Search
CPC ...... B24B 23/028; B24B 41/04; B24B 47/26; B23Q 11/0092; F16D 59/00; F16D 55/02
See application file for complete search history.

(56) References Cited

U.S. PATENT DOCUMENTS

| | | | | |
|---|---|---|---|---|
| 5,601,483 | A * | 2/1997 | Rudolf ................. | B24B 23/022 451/342 |
| 8,657,032 | B2 * | 2/2014 | Numata ................ | B24B 23/028 173/156 |
| 9,079,290 | B2 * | 7/2015 | Esenwein ............. | B24B 23/028 |
| 2013/0284551 | A1 * | 10/2013 | Nadig ................ | B23Q 11/0092 188/267 |
| 2014/0034434 | A1 * | 2/2014 | Esenwein .......... | B23Q 11/0092 188/267 |
| 2014/0080387 | A1 * | 3/2014 | Kuether ............... | B24B 23/028 451/344 |
| 2014/0124307 | A1 * | 5/2014 | Esenwein ............. | B24B 23/028 188/180 |
| 2014/0206265 | A1 * | 7/2014 | Maute ................... | B24B 47/026 451/358 |
| 2015/0087211 | A1 * | 3/2015 | Baykara ............... | B24B 23/028 451/359 |
| 2015/0202738 | A1 * | 7/2015 | Boeck .................. | B24B 55/052 451/359 |

FOREIGN PATENT DOCUMENTS

DE          195 10 291 C2    9/1996

* cited by examiner

*Primary Examiner* — Timothy V Eley
(74) *Attorney, Agent, or Firm* — Maginot, Moore & Beck LLP

(57) ABSTRACT

A power tool braking device of a portable power tool includes at least one braking unit that is configured to brake a spindle of the portable power tool and/or a machining tool in at least one braking position of the braking unit. The power tool braking device further includes at least one spindle fixing unit that is configured to fix the spindle in at least one fixing position of the spindle fixing unit. The braking unit and the spindle fixing unit are at least partially configured as a single piece.

11 Claims, 5 Drawing Sheets

POWER TOOL BRAKING DEVICE

This application claims priority under 35 U.S.C. §119 to patent application no. DE 10 2013 200 867.8 filed on Jan. 21, 2013 in Germany, the disclosure of which is incorporated herein by reference in its entirety.

BACKGROUND

DE 195 10 291 C2 already discloses a power tool braking device of a portable power tool, which has a braking unit for braking a spindle and/or a machining tool in a braking position of the braking unit. In addition, the power tool braking device comprises a spindle fixing unit for fixing the spindle in at least one fixing position of the spindle fixing unit.

SUMMARY

The disclosure is based on a power tool braking device of a portable power tool, comprising at least one braking unit for braking a spindle and/or a machining tool in at least one braking position of the braking unit, and comprising at least one spindle fixing unit for fixing the spindle in at least one fixing position of the spindle fixing unit.

It is proposed that the braking unit and the spindle fixing unit are at least partially designed as a single piece. The braking unit and the spindle fixing unit preferably form a common assembly. The braking unit is preferably provided in order at least partially to transfer a relative movement between at least one driver element of the braking unit and at least one braking element of the braking unit into a further relative movement between the driver element and the braking element in order to produce a braking force in a braking position of the braking unit. The driver element is preferably provided here in order, in at least one operating state, to move a spindle fixing element of the spindle fixing unit relative to the braking element. The braking unit is preferably designed as a mechanical braking unit. The expression "mechanical braking unit" is intended here in particular to define a braking unit which is provided for transferring at least the braking element and/or a counterbraking element, in particular a brake lining, of the braking unit into a braking position and/or into a release position as a consequence of mechanical actuation, in particular as a consequence of a force of a component being exerted on the braking element and/or the counterbraking element by means of direct contact between the component and the braking element and/or the counterbraking element, in particular in a manner decoupled from a magnetic force. "Provided" is intended to be understood in particular as meaning specially designed and/or specially equipped. A "braking position" is intended to be understood here as meaning in particular a position of the braking element and/or of the counterbraking element, in which, in at least one operating state, at least one braking force is exerted on a moving component in order to reduce a speed of a moving component, in particular by at least more than 50%, preferably by at least more than 65% and particularly preferably by at least more than 80%, of said moving component within a predetermined period of time. The predetermined period of time here is in particular shorter than 5 s.

The term "release position" here is intended in particular to define a position of the braking element and/or of the counterbraking element, in which an action of the braking force on the moving component in order to reduce the speed is at least substantially prevented. The mechanical braking unit is preferably provided in order to brake the component from a working speed, in particular to brake the component to a speed which is less than 50% of the working speed, preferably less than 20% of the working speed and particularly preferably to brake the component to a speed of 0 m/s, in particular within a predetermined period of time of greater than 0.1 s, preferably of greater than 0.5 s and particularly preferably of shorter than 3 s. The mechanical braking unit is particularly preferably designed as a friction brake. The braking element here is preferably designed as a brake disk. The brake disk is preferably formed from stainless steel and/or from another material appearing expedient to a person skilled in the art, such as, for example, sintered bronze, steel, nitrided steel, aluminum or another surface-treated steel and/or metal. A brake lining which is arranged on the braking element or on the counterbraking element and with which the counterbraking element or the braking element interacts in order to generate a braking force is preferably designed as a sintered brake lining, as an organic brake lining, as a brake lining made from carbon, as a brake lining made from ceramic or as another brake lining appearing expedient to a person skilled in the art.

Preferably, for transferring the relative movement between the driver element and the braking element into a further relative movement between the driver element and the braking element, the braking unit preferably comprises a movement conversion unit. A "movement conversion unit" here is intended to be understood in particular as meaning a unit which comprises a mechanism, in particular a ramp, a thread, a cam mechanism, a coupling mechanism or another mechanism appearing expedient to a person skilled in the art, by means of which a type of movement, such as, for example, a translation, can be converted into a different type of movement, such as, for example, a rotation and/or a combining of rotation and translation, and/or a movement of a component in one direction can be converted into a movement of a further component in a further direction. A relative movement, which is designed as rotation, between the driver element and the braking element is preferably converted into a further relative movement, which is designed as translation, between the driver element and the braking element by means of the movement conversion unit. Thus, in order to generate a braking force in a braking position of the braking unit, the braking element is preferably moved relative to the driver element by a combination of rotation and translation. By this means, as a consequence of contact of the braking element with a counterbraking element, which is mounted so as to rotate with said braking element, of the braking unit, a braking force is generated as a consequence of friction between the braking element and the counterbraking element. The term "driver element" here is intended in particular to define an element which is provided in order to be moved at the same time during a movement of a further element, in particular in order to be moved at the same time with a time delay at least at the beginning of a movement relative to the further element, and/or which is provided in order to carry along or at the same time to move a further element as a consequence of a connection during a movement. The driver element is preferably provided in order to be moved at the same time by the braking element at the beginning of a rotational movement of the braking element with a time delay relative to the movement of the braking element. The driver element therefore preferably has rotational play relative to the braking element, the rotational play permitting a relative movement between the driver element and the braking element about an axis of rotation over an angular range of greater than 1°, preferably greater than 2°, and particularly preferably greater than 4°.

The term "spindle fixing unit" is intended here in particular to define a unit which, at least in one fixing position, prevents a movement of a spindle, in particular a rotational movement of the spindle, for fastening a machining tool to and/or on the spindle and/or for release of the machining tool from the spindle, for example when changing a machining tool, in particular except for a play-induced and/or tolerance-induced movement possibility of the spindle. The spindle fixing unit is particularly preferably designed as a "spindle lock unit". "At least partially as a single piece" is intended here to be understood in particular as meaning that the braking unit and the spindle fixing unit together use at least one element, in particular an element separate to an output element, which is designed as an output gearwheel, of an output unit, to carry out a function of the braking unit to brake the spindle or to carry out a function of the spindle fixing unit to fix the spindle.

The braking unit and the spindle fixing unit particularly preferably together form an installation module. The expression "installation module" is intended here in particular to define a construction of a unit, in which a plurality of components are preassembled and the unit is installed as a whole in an overall system, in particular in a portable power tool. The installation module preferably has at least one fastening element which is provided to releasably connect the installation module to the overall system. The installation module can advantageously be removed from the overall system in particular with fewer than 10 fastening elements, preferably with fewer than 8 fastening elements and particularly preferably with fewer than 5 fastening elements. The fastening elements are particularly preferably designed as screws. However, it is also conceivable for the fastening elements to be designed as different elements appearing expedient to a person skilled in the art, such as, for example, rapid clamping elements, fastening elements actuable without a tool, etc. At least one function of the installation module can preferably be ensured in a state removed from the overall system. The installation module can particularly preferably be removed by an end user. The installation module is therefore designed as an interchangeable unit which can be replaced by a further installation module, such as, for example, in the event of a defect of the installation module or a function extension and/or function change of the overall system. A compact power tool braking device can advantageously be realized by means of the configuration according to the disclosure. Construction space, components and outlay on installation can advantageously be saved. In addition, a high level of operating convenience can advantageously be achieved. By means of a configuration as an installation module, the power tool braking device can simply be interchanged by an operator or an expert dealer or a workshop. In addition, the power tool braking device can be fitted on existing portable power tools in the form of an upgrade. Variants of a portable power tool with/without a braking unit and/or spindle fixing unit are therefore advantageously usable in a simple manner in a manufacturing process.

Furthermore, it is proposed that the braking unit and the spindle fixing unit comprise at least one common activating element which is provided in order, in at least one operating state, to activate a transfer of the braking unit into the braking position and to activate a transfer of the spindle fixing unit into the fixing position. An "activating element" is intended here to be understood in particular as meaning an element which releases and/or moves at least one element in order to initiate a braking operation or a fixing operation. In this connection, the activating element can release and/or move the element directly or indirectly. The activating element can be designed as a servo motor, as an actuator, as a movement conversion element, as a lever, as a switch, as an extension, etc., wherein the activating element can release and/or move at least one element of the braking unit and at least one element of the spindle fixing unit. By means of the configuration according to the disclosure, it is advantageously possible for a transfer of the braking unit into a braking position and advantageously possible for a transfer of the spindle fixing unit into a fixing position to be realized by means of an individual element. By this means, a particularly reliable activation of the braking unit and of the spindle fixing unit can be made possible.

Furthermore, it is proposed that the braking unit and the spindle fixing unit comprise at least the common activating element which is connected to a braking element of the braking unit for rotation with said braking element. "Connected for rotation with" is intended to be understood in particular as meaning a connection which, averaged over a complete revolution, transmits a power flux with an unchanged torque, an unchanged direction of rotation and/or an unchanged rotational speed. In this connection, the activating element can be connected to the braking element for rotation therewith by means of at least one fastening element of the braking unit and/or of the spindle fixing unit, or can be formed integrally with the braking element. "Integrally" is intended to be understood in particular as meaning connected at least in an integrally bonded manner, for example by a welding process, an adhesive bonding process, an injection molding process and/or another process appearing expedient to a person skilled in the art, and/or as advantageously meaning formed as a single piece, such as, for example, by means of production from a cast part and/or by means of production in a single- or multi-component injection molding process and advantageously from an individual blank. The braking element is preferably arranged axially spaced apart relative to the activating element, as viewed along an axis of rotation of the activating element and/or of the braking element. It is conceivable in this connection for the braking element to be arranged in an axially captive manner on the activating element by means of the fastening element. "Arranged in a captive manner" is intended here to be understood in particular as meaning an arrangement of at least two elements relative to each other, in which the elements are movable relative to each other, in particular are movable at least axially relative to each other, but a removal or separating of the elements is possible only by means of release of a captive-keeping element, such as, for example, the fastening element. By means of the configuration according to the disclosure, a rotational movement can advantageously be used in order to activate the braking unit. Furthermore, reliable activation of the braking unit can advantageously be made possible.

In addition, it is proposed that the braking unit and the spindle fixing unit comprise at least one common activating element which has at least one coupling region which, in a fitted state, engages in a recess of a driver element of the braking unit. The term "driver element" is intended here in particular to define an element which is provided in order to be moved at the same time during a movement of a further element, in particular in order to be moved at the same time with a time delay relative to the further movement at least at the beginning of a movement, and/or which is provided in order to carry along or to move at the same time a further element as a consequence of a connection during a movement. The driver element preferably has rotational play relative to the braking element, said rotational play permitting a relative movement between the driver element and the braking element about an axis of rotation through an angular range of greater than 1°, preferably greater than 2° and particularly preferably greater than 4°. The carry-along element is particularly preferably connected to an output element, in particular to the spindle, for rotation therewith. The coupling region is preferably designed as an extension. The recess of the driver element preferably has a larger extent than the coupling region, in particular as viewed in a circumferential direction running in a plane extending at least substantially perpendicularly to an axis of rotation of the driver element. The expression "substantially perpendicularly" is intended here in particular to define an alignment of a direction relative to a reference direction, wherein the direction and the reference direction, in particular as viewed in a plane, enclose an angle of 90°, and the angle has a maximum deviation of in particular less than 8°, advantageously less than 5° and particularly advantageously less than 2°. By means of the configuration according to the disclosure, a structurally simple interlocking connection can be achieved. In addition, a compact arrangement of components can advantageously be achieved.

Furthermore, it is proposed that the braking unit comprises at least the driver element which is provided to move the braking element of the braking unit relative to the activating element as a consequence of a relative movement of the common activating element of the braking unit and of the spindle fixing unit and also of the driver element. For this purpose, the driver element preferably comprises a braking element movement range which is provided in order, as a consequence of a relative movement between the driver element and the activating element, to generate at least one force component in a direction facing away from the driver element in order to move the braking element. The braking element movement range can have various configurations appearing expedient to a person skilled in the art, such as, for example, a configuration as a bolt which is fixedly connected to the driver element, in particular is integrally formed on the driver element, and engages in a radial cam designed as a groove, or a configuration as a ramp which is arranged on the driver element and interacts with a further ramp arranged on the braking element. By means of the configuration according to the disclosure, a relative movement between the driver element and the activating element, in particular a rotation about an axis of rotation of the driver element and/or of the activating element, can advantageously be used for producing a movement of the braking element. A relative movement, caused by the spindle coming to a stop, between the driver element and the activating element in order to activate the braking unit and/or the spindle fixing unit can be achieved in a structurally simple manner.

Furthermore, it is proposed that the braking unit comprises at least the driver element which comprises at least one ramp-shaped braking element movement region. "Ramp-shaped" is intended here to be understood in particular as meaning a geometrical shape which has a mathematically defined pitch along a section from a starting point toward an end point such that there is a height difference between the starting point and the end point and/or the starting point is arranged in a plane which runs offset at least substantially parallel to a plane in which the end point is arranged. A plane formed by a sliding surface of the braking element movement region therefore preferably encloses an angle differing from 90° and from an integral multiple of 90° with a plane running at least substantially parallel to a side of the driver element that faces the braking element. "Substantially parallel" is intended here as meaning in particular an alignment of a direction relative to a reference direction, in particular in a plane, wherein the direction has a deviation in particular of smaller than 8°, advantageously smaller than 5° and particularly advantageously smaller than 2° in relation to the reference direction. By means of the configuration according to the disclosure, a movement unit, in which an axial movement of the braking element in a direction facing away from the driver element can be achieved in a structurally simple manner as a consequence of a relative movement between the driver element and the braking element, can be achieved cost-effectively.

In addition, it is proposed that the braking unit comprises at least the driver element which is provided in order, in at least one operating state, to move at least one spindle fixing element of the spindle fixing unit relative to the common activating element of the braking unit and of the spindle fixing unit. The driver element preferably moves the spindle fixing element relative to the activating element as a consequence of a relative movement between the driver element and the activating element. The spindle fixing element in this case preferably has at least one movement component which runs at least substantially perpendicularly to an axis of rotation of the driver element and/or of the activating element, in particular radially with respect to the axis of rotation. The spindle fixing element in this case is preferably clamped between a clamping element of the spindle fixing unit and the driver element in order to fix the spindle in the fixing position. The clamping element is preferably arranged outside the spindle fixing element, as viewed in a direction extending from an axis of rotation of the driver element and/or of the activating element at least substantially perpendicularly to the axis of rotation of the driver element and/or of the activating element. The clamping element preferably surrounds the driver element and/or the spindle fixing element in the circumferential direction. In this case, the clamping element is advantageously designed in the shape of a circular ring, for example in the shape of a hollow cylinder, as a clamping drum, etc. The driver element is preferably part of the braking unit and part of the spindle fixing unit. By means of the configuration according to the disclosure, a structural interrelationship between the braking unit and the spindle fixing unit can advantageously be achieved in order to permit a high level of operating convenience. In addition, a compact construction of the brake unit and of the spindle fixing unit can advantageously be made possible.

Furthermore it is proposed that the braking unit comprises at least the driver element which has at least one clamping contour for clamping at least the spindle fixing element of the spindle fixing unit. The clamping contour preferably extends in the circumferential direction on an outer circumference of the driver element. However, it is also conceivable for the clamping contour to be arranged on the driver element at a different position appearing expedient to a person skilled in the art. By means of the configuration according to the disclosure, a compact configuration of the power tool braking device can advantageously be achieved.

Furthermore, it is proposed that the spindle fixing unit comprises at least one spindle fixing element which is designed as a rolling element. A "rolling element" is intended here to be understood in particular as meaning an element which is formed in a rotationally symmetrical manner at least about one axis, in particular an axis of rotation. In particular, the rolling element is provided in order, at least in one operating state, to roll with at least one surface, in particular a lateral area, on a surface of a component as a consequence of a rotational movement about the axis of rotation. The rolling element is preferably designed as a cylinder. However, it is also conceivable for the rolling element to be designed as a ball, as a cone, as a barrel or as another rotational body appearing expedient to a person skilled in the art. A rolling movement of the rolling element can advantageously be used in order to reach a fixing position of the spindle fixing unit. In addition, a low frictional resistance can advantageously be achieved during a transfer of the spindle fixing unit into the fixing position.

In addition, it is proposed that the power tool braking device comprises at least one output unit which comprises at least one output element on which a common activating element of the braking unit and of the spindle fixing unit is arranged. The activating element in this case can be connected to the output element for rotation therewith by means of fastening elements of the braking unit and/or of the spindle fixing unit, or can be formed integrally with the output element. The fastening elements here can be designed as rivets, as screws and/or as further fastening elements appearing expedient to a person skilled in the art. The output element is preferably designed as a gearwheel, in particular as a ring gear, of the output unit. The output element is supported in this case with one side on the driver element. With a side facing away from the driver element, the output element can be supported on a securing ring arranged on the spindle or on a driving element designed as a pinion. An "output unit" is intended here to be understood in particular as meaning a unit which is drivable by means of a drive unit of a portable power tool and transmits forces and/or torques generated by the drive unit to a machining tool and/or to a tool-holding fixture of a portable power tool. The output unit is preferably designed as an angular mechanism. An "angular mechanism" is intended here to be understood in particular as meaning a mechanism which, in order to transmit forces and/or torques, has an axis of rotation of an outlet element, which axis of rotation is arranged at an angle relative to an axis of rotation of an inlet element, wherein the axis of rotation of the inlet element and the axis of rotation of the outlet element preferably have a common intersecting point. "Arranged at an angle" is intended here to be understood in particular as meaning an arrangement of an axis relative to a further axis, in particular of two intersecting axes, wherein the two axes enclose an angle differing from 180°. The axis of rotation of the inlet element and the axis of rotation of the outlet element preferably enclose an angle of 90° in a fitted state of the output unit designed as an angular mechanism. By means of the configuration according to the disclosure, a compact arrangement of the braking unit and of the spindle fixing unit, which can advantageously act on an output element, can be achieved in a structurally simple manner.

Furthermore, the disclosure is based on a portable power tool with a power tool braking device according to the disclosure. A "portable power tool" is intended here to be understood in particular as meaning a power tool for machining workpieces, which power tool can be transported without a transport machine by an operator. The portable power tool has in particular a mass which is less than 40 kg, preferably less than 10 kg and particularly preferably less than 5 kg. The portable power tool is preferably designed as an angle grinder. However, it is also conceivable for the portable power tool to have a different configuration appearing expedient to a person skilled in the art, such as, for example, a configuration as a circular saw, as a drill, as a hammer drill and/or as a chisel hammer, as a garden implement, etc. By means of the configuration according to the disclosure, a high level of operating convenience for an operator of the portable power tool can advantageously be achieved, since in particular untrue running can advantageously be ensured by means of a movement of the braking element in the direction of the driver element when the portable power tool is set into operation.

The power tool braking device according to the disclosure and/or the power tool according to the disclosure is/are not intended to be restricted here to the use and embodiment described above. In particular the power tool braking device according to the disclosure and/or the power tool according to the disclosure can have a number of individual elements, components and units differing from a number mentioned herein in order to carry out a function described herein.

BRIEF DESCRIPTION OF THE DRAWINGS

Further advantages emerge from the description below of the drawings. The drawings illustrate exemplary embodiments of the disclosure. The drawings, the description and the claims contain numerous features in combination. A person skilled in the art will expediently also consider the features individually and put them together to form meaningful further combinations.

In the drawings.

DETAILED DESCRIPTION

Figure 1:
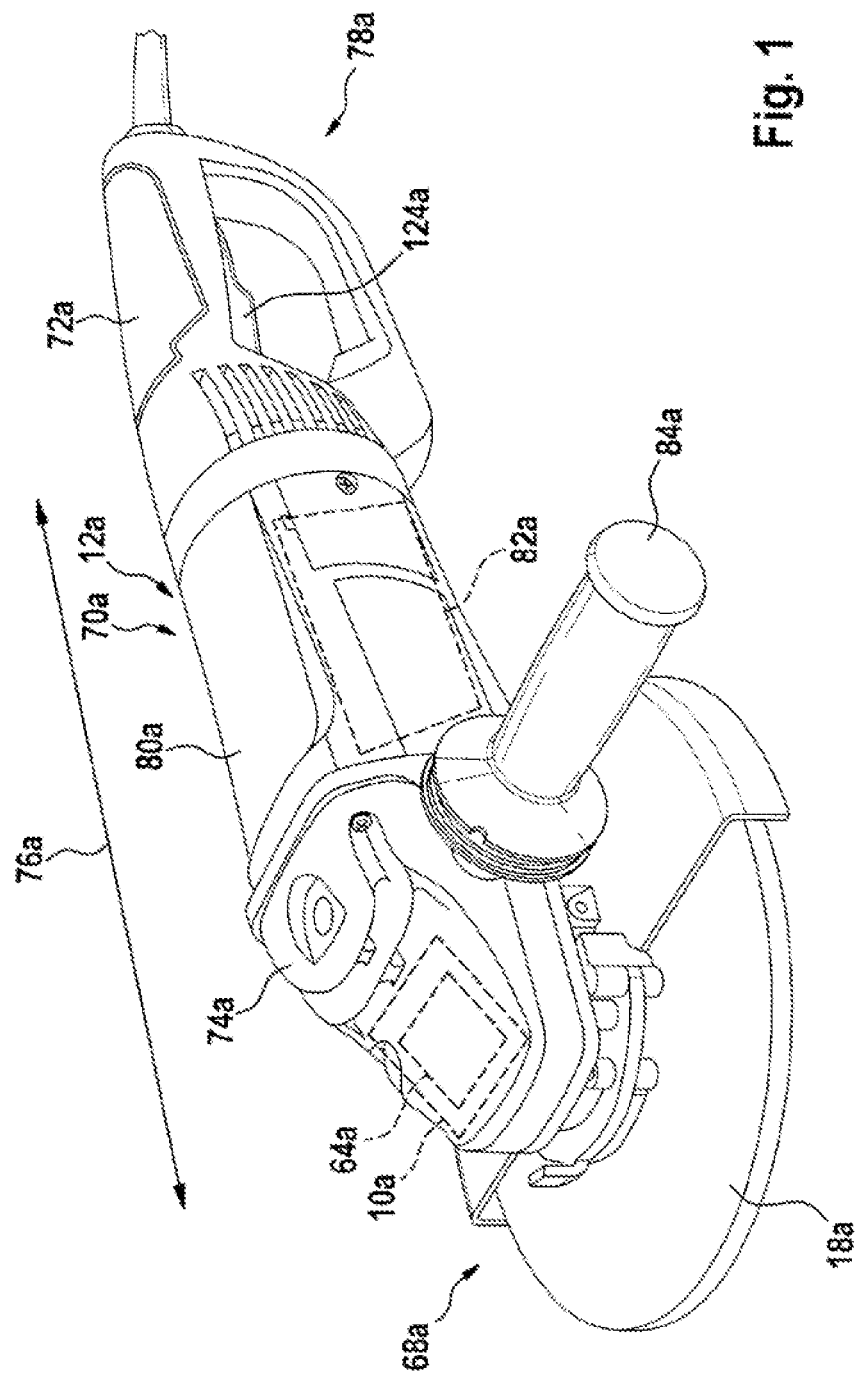
FIG. 1 shows a portable power tool according to the disclosure with a power tool braking device according to the disclosure in a schematic illustration.

FIG. 1 shows a portable power tool 12a which is designed as an angle grinder and has a power tool braking device 10a. The power tool braking device 10a is therefore designed as a hand-held power tool braking device. The portable power tool 12a comprises a protective hood unit 68a, a power tool housing 70a and a main handle 72a. The main handle 72a extends from a gear housing 74a of the power tool housing 70a in a direction which faces away from the gear housing 74a and runs at least substantially parallel to a main direction of extent 76a of the portable power tool 12a as far as a side 78a of the power tool housing 70a, on which a cable of the portable power tool 12a is arranged for supplying power. The main handle 72a is fixed on a motor housing 80a of the power tool housing 70a. It is conceivable here for the main handle 72a to be connected to the motor housing 80a via a handle damping unit (not illustrated specifically here). A spindle 16a of an output unit 64a of the power tool braking device 10a (FIG. 2) extends out of the gear housing 74a, with it being possible for a machining tool 18a for machining a workpiece (not illustrated specifically here) to be fixed on said spindle. The machining tool 18a is designed as a grinding wheel. However, it is also conceivable for the machining tool 18a to be designed as a cutoff wheel or polishing wheel. The power tool housing 70a comprises the motor housing 80a for receiving a drive unit 82a of the portable power tool 12a, and the gear housing 74a for receiving the output housing 64a and the power tool braking device 10a. The drive unit 82a is provided to drive the machining tool 18a in a rotating manner via the output unit 64a. Furthermore, the machining tool 18a can be connected to the spindle 16a for rotation therewith by means of a fastening element (not illustrated specifically here) in order to machine a workpiece. The machining tool 18a can therefore be driven in a rotating manner during operation of the portable power tool 12a. The output unit 64a is connected to the drive unit 82a in a manner already known to a person skilled in the art via a drive element (not illustrated specifically here) of the drive unit 82a, which drive element is designed as a pinion and is drivable in a rotating manner. In addition, an additional handle 84a is arranged on the gear housing 74a. The additional handle 84a extends transversely with respect to the main direction of extent 76a of the portable power tool 12a.

Figure 2:
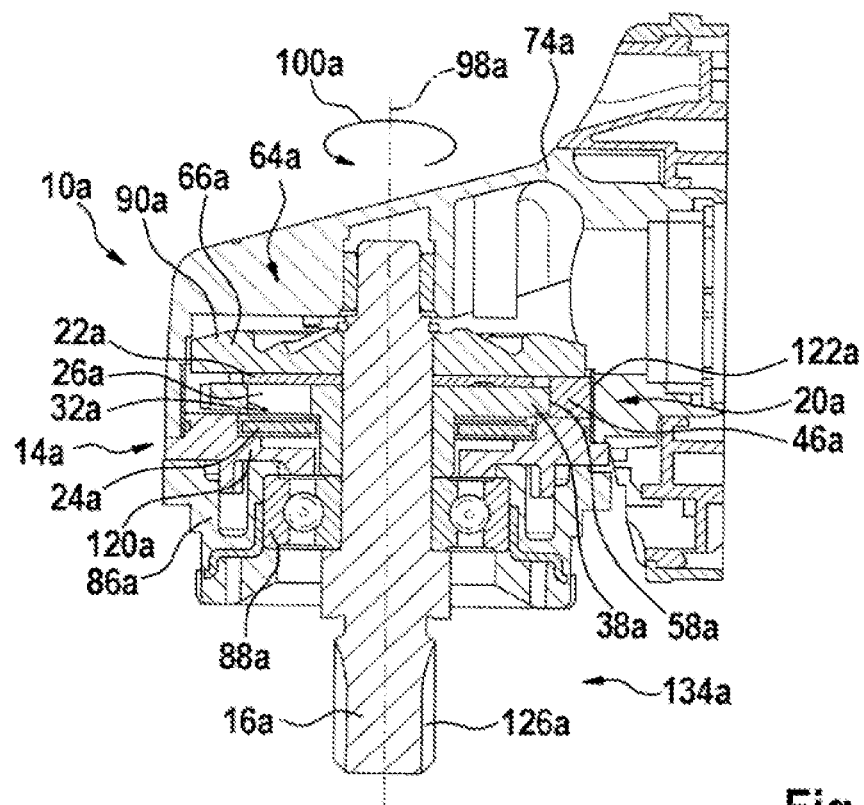
FIG. 2 shows a sectional view of the power tool braking device according to the disclosure in a gear housing of the portable power tool according to the disclosure, said gear housing having been removed from a motor housing of the portable power tool according to the disclosure, in a schematic illustration.

The output unit 64a furthermore comprises a bearing flange 86a and a bearing element 88a, which is arranged in the bearing flange 86a, for the mounting of the spindle 16a (FIG. 2). The bearing flange 86a is connectable releasably to the gear housing 74a by means of fastening elements (not illustrated specifically here) of the output unit 64a. Furthermore, the bearing flange 86a has a hybrid construction. The bearing flange 86a is therefore at least partially formed from plastic and partially from a material different from plastic. In this connection, the material different from a plastic can be, for example, aluminum, steel, carbon, an alloy of one of the abovementioned materials or a different material appearing expedient to a person skilled in the art. Furthermore, the power tool braking device 10a has a runoff protection unit 134a (FIGS. 3 to 7) which is already known to a person skilled in the art and is provided to prevent the machining tool 18a and/or the fastening element for fastening the machining tool 18a from running off from the spindle 16a in a braking mode of the power tool braking device 10a. The runoff protection unit 134a here is designed as a groove 126a which is provided in the spindle 16a. However, it is also conceivable for the runoff protection unit 134a to be designed as a receiving flange which is connectable to the spindle 16a for rotation therewith by means of an interlocking connection and has a function already known to a person skilled in the art.

FIG. 2 shows a sectional view of the power tool braking device 10a according to the disclosure in a gear housing 74a which has been removed from the motor housing 80a. The power tool braking device 10a of the portable power tool 12a comprises at least one braking unit 14a for braking the spindle 16a and/or the machining tool 18a in at least one braking position of the braking unit 14a. Furthermore, the power tool braking device 10a comprises at least one spindle fixing unit 20a for fixing the spindle 16a in at least one fixing position of the spindle fixing unit 20a. The braking unit 14a and the spindle fixing unit 20a are at least partially formed as a single piece. In this connection, the braking unit 14a and the spindle fixing unit 20a comprise at least one common activating element 22a which is provided in order, in at least one operating state, to activate a transfer of the braking unit 14a into the braking position and to activate a transfer of the spindle fixing unit 20a into the fixing position.

The common activating element 22a is arranged on an output element 66a of the output unit 64a. In this connection, the common activating element 22a is arranged on a side of the output element 66a that faces away from a toothing 90a of the output element 66a, which is in the form of a ring gear (FIGS. 3, 6 and 7; the toothing 90a is indicated merely in a partial region). The common activating element 22a is connected to the output element 66a for rotation therewith by means of at least one connecting element 92a of the braking unit 14a and/or of the spindle fixing unit 20a. Overall, the common activating element 22a is connected to the output element 66a for rotation therewith by means of at least three connecting elements 92a, 94a, 96a. The connecting elements 92a, 94a, 96a here are designed as screws. However, it is also conceivable for the braking unit 14a and/or the spindle fixing unit 20a to comprise a number of connecting elements 92a, 94a, 96a differing from 3 for forming a connection of the common activating element 22a and of the output element 66a for rotation together. In addition, it is conceivable for the common activating element 22a to be connected to the output element 66a for rotation therewith by means of a different type of connection appearing expedient to a person skilled in the art, such as, for example, by means of a frictional and/or by means of an integrally bonded connection, in particular an integral configuration of the common activating element 22a with the output element 66a. Furthermore, the common activating element 22a of the braking unit 14a and of the spindle fixing unit 20a is connected to a braking element 24a of the braking unit 14a for rotation with said braking element. The braking element 24a here is designed as a brake disk.

The braking unit 14a comprises at least one rotational carry-along element 102a, 104a, 106a which is provided for connecting the braking element 24a to the common activating element 22a in an interlocking manner. In this connection, the rotational carry-along element 102a, 104a, 106a connects the braking element 24a in an interlocking manner in a circumferential direction 100a running in a plane extending at least substantially perpendicularly to an axis of rotation 98a of the spindle 16a. Overall, the braking unit 14a has three rotational carry-along elements 102a, 104a, 106a (FIGS. 4 and 5) which are provided for connecting the braking element 24a to the common activating element 22a in an interlocking manner. However, it is also conceivable for the braking unit 14a to have a number of rotational carry-along elements 102a, 104a, 106a differing from 3 for forming an interlocking connection. In addition, the rotational carry-along elements 102a, 104a, 106a are provided for mounting the braking element 24a in an axially movable manner relative to the common activating element 22a, as viewed along the axis of rotation 98a of the spindle 16a. A possibility of moving the braking element 24a relative to the common activating element 22a in two opposite directions, as viewed along the axis of rotation 98a of the spindle 16a, is limited by means of the rotational carry-along elements 102a, 104a, 106a. However, it is also conceivable for the braking element 24a to be acted upon by a spring force by means of a spring element (not illustrated specifically here) in the direction of the common activating element 22a and for the rotational carry-along elements 102a, 104a, 106a to limit a possibility of moving the braking element 24a relative to the common activating element 22a in the direction of the common activating element 22a, as viewed along the axis of rotation 98a of the spindle 16a.

The rotational carry-along elements 102a, 104a, 106a are of cylindrical design. However, it is also conceivable for the rotational carry-along elements 102a, 104a, 106a to have a different configuration appearing expedient to a person skilled in the art, for example a polygonal configuration. The rotational carry-along elements 102a, 104a, 106a are fastened to the braking element 24a. The rotational carry-along elements 102a, 104a, 106a here can be formed integrally with the braking element 24a or can be fastened to the braking element 24a by means of an interlocking, frictional and/or integrally bonded connection. Furthermore, in a fitted state, the rotational carry-along elements 102a, 104a, 106a extend from the braking element 24a in the direction of the common activating element 22a at least substantially parallel to the axis of rotation 98a of the spindle 16a. Furthermore, the rotational carry-along elements 102a, 104a, 106a respectively engage in a rotational carry-along recess 108a, 110a, 112a of the common activating element 22a for the interlocking connection with the common activating element 22a. The rotational carry-along recesses 108a, 110a, 112a here are respectively arranged in a coupling region 26a, 28a, 30a of the common activating element 22a. The common activating element 22a of the braking unit 14a and of the spindle fixing unit 20a therefore has at least the coupling region 26a, 28a, 30a which, in a fitted state, engages in a recess 32a, 34a, 36a of a driver element 38a of the braking unit 14a. Overall, the activating element 22a has three coupling regions 26a, 28a, 30a which are arranged distributed uniformly on the activating element in the circumferential direction 100a running in the plane which extends at least substantially perpendicularly to the axis of rotation 98a of the spindle 16a. However, it is conceivable for the common activating element 22a to have a number of coupling regions 26a, 28a, 30a differing from three for forming a connection of the common activating element 22a and of the braking element 24a. The coupling regions 26a, 28a, 30a are designed as extensions. The coupling regions 26a, 28a, 30a here extend from the common activating element 22a at least substantially parallel to the axis of rotation 98a of the spindle 16a in the direction of the driver element 38a and in the direction of the braking element 24a.

The braking unit 14a is provided for at least partially converting a relative movement between the driver element 38a and the braking element 24a into a further relative movement between the driver element 38a and the braking element 24a in order to produce a braking force in a braking position of the braking unit 14a. The driver element 38a is arranged on the spindle 16a for rotation therewith. The output element 66a, which is in the form of a ring gear, is mounted rotatably on the spindle 16a together with the braking element 24a and the common activating element 22a so as to be rotatable about an axis of rotation of the driver element 38a, which axis of rotation runs coaxially with respect to the axis of rotation 98a of the spindle 16a, by an angle of less than 90° relative to the spindle 16a.

Figure 4:
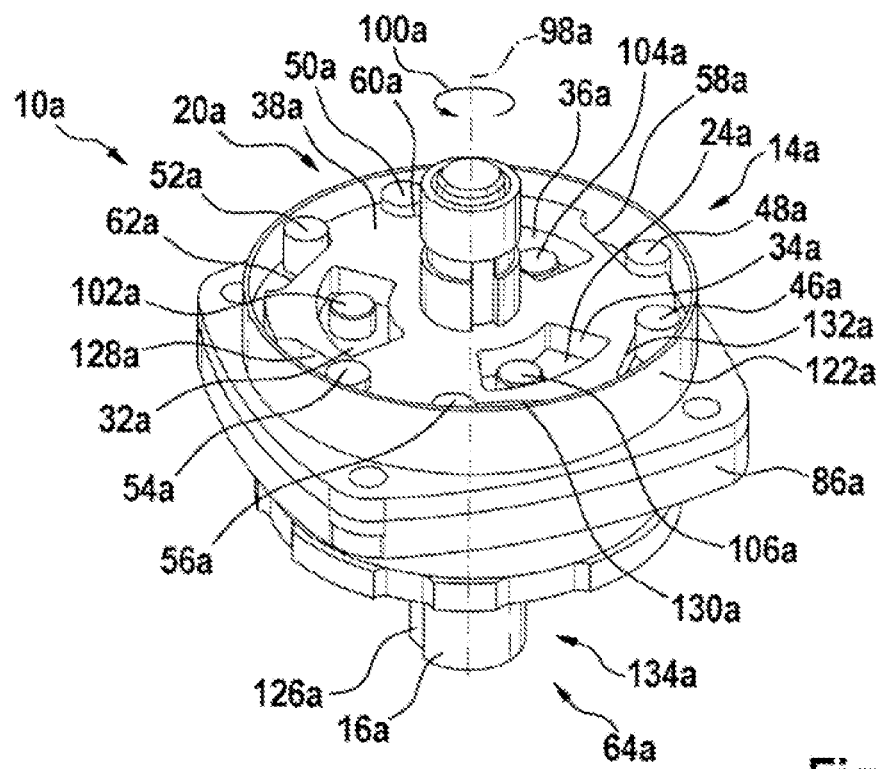
FIG. 4 shows a view of a detail of the power tool braking device according to the disclosure with a removed output element of an output unit of the power tool braking device according to the disclosure, in a schematic illustration.
Figure 5:
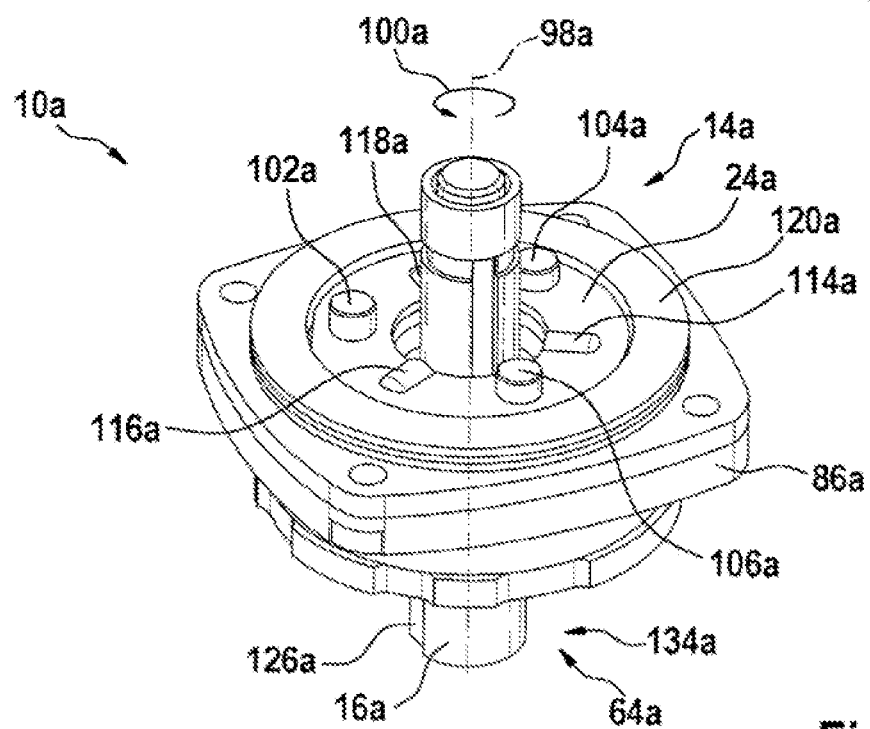
FIG. 5 shows a view of a detail of a braking element, which is arranged in a bearing flange of the output unit, of a braking unit of the power tool braking device according to the disclosure, in a schematic illustration.
Figure 6:
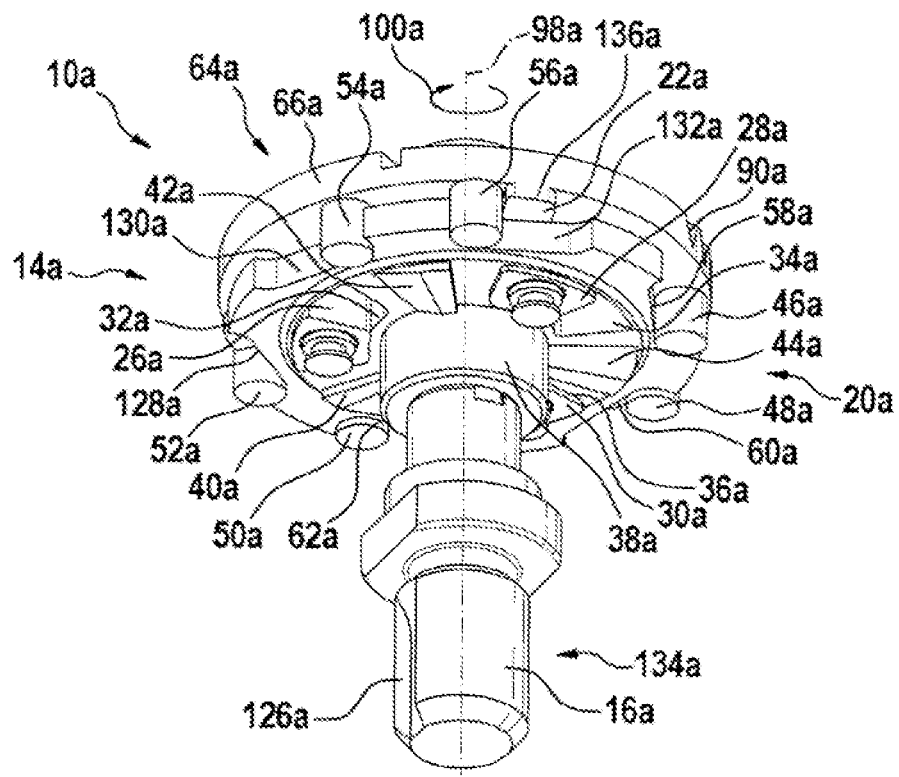
FIG. 6 shows a view of a detail of a driver element, which is arranged on the output element, of the braking unit, in a schematic illustration.
Figure 7:
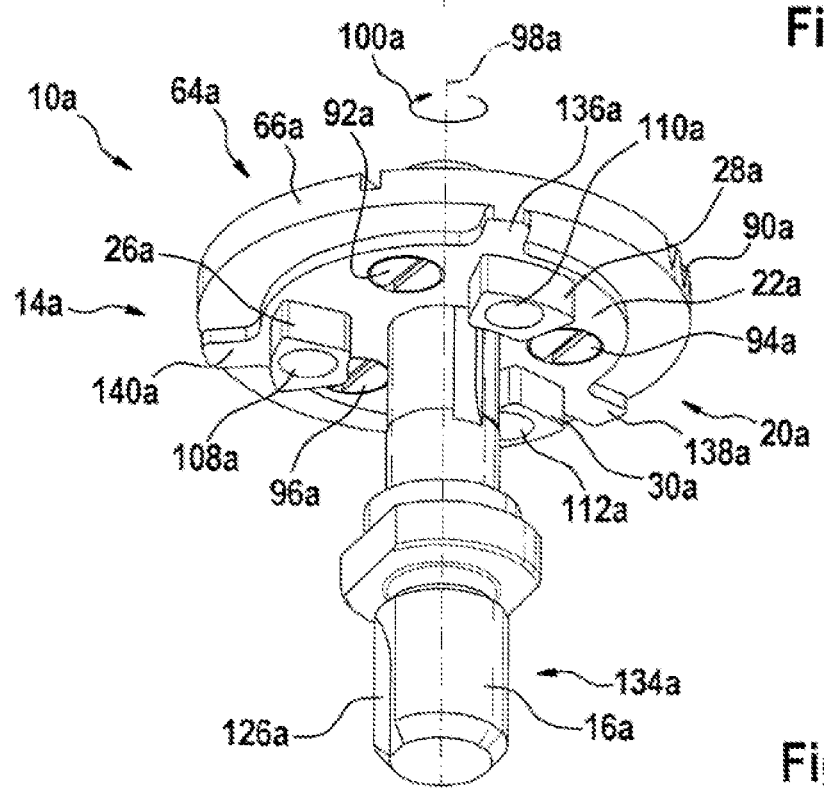
FIG. 7 shows a view of a detail of a common activating element, which is arranged on the output element, of the braking unit and of a spindle fixing unit of the power tool braking device according to the disclosure, in a schematic illustration.

The coupling regions 26a, 28a, 30a are provided to limit a relative rotational movement of the common activating element 22a, and therefore of the braking element 24a and also of the output element 66a, to a predetermined angular range about the axis of rotation of the driver element 38a relative to the driver element 38a. The coupling regions 26a, 28a, 30a are arranged distributed uniformly on the common activating element 22a in the circumferential direction 100a (FIG. 7). The coupling regions 26a, 28a, 30a each engage in one of the recesses 32a, 34a, 36a of the driver element 38a. The driver element 38a overall comprises three recesses 32a, 34a, 36a. However, it is also conceivable for the driver element 38a to have a number of recesses 32a, 34a, 36a differing from three, in each of which a coupling region 26a, 28a, 30a of the common activating element 22a engages. The recesses 32a, 34a, 36a of the driver element 38a are arranged distributed uniformly in the circumferential direction 100a on the driver element 38a (FIGS. 4 and 6). Furthermore, the recesses 32a, 34a, 36a of the driver element 38a have a greater extent in the circumferential direction 100a than the coupling regions 26a, 28a, 30a. Rotational play between the common activating element 22a and the driver element 38a is therefore achieved in the circumferential direction 100a. The rotational play is formed by an angular range by which the common activating element 22a together with the output element 66a and the braking element 24a can be rotated relative to the driver element 38a. The angular range by which the common activating element 22a and therefore the output element 66a and the braking element 24a are mounted rotatably about the axis of rotation of the driver element 38a relative to the driver element 38a is therefore limited by means of interaction of the coupling regions 26a, 28a, 30a and the recesses 32a, 34a, 36a of the driver element 38a.

Furthermore, on a side facing the driver element 38a in a fitted state, the braking element 24a has at least one lifting element 114a, 116a, 118a which is provided for moving the braking element 24a toward a counterbraking element 120a of the braking unit 14a during a rotational movement relative to the driver element 38a and/or to the spindle 16a for producing a braking force for braking a rotational movement of the output element 66a and of the spindle 16a in a direction running at least substantially parallel to the axis of rotation 98a of the spindle 16a and facing away from the driver element 38a. The counterbraking element 120a is arranged in the bearing flange 86 of the output unit 64a for rotation with said bearing flange. The counterbraking element 120a here can be formed with a brake lining. Overall, the braking element 24a has three lifting elements 114a, 116a, 118a. However, it is also conceivable for the braking element 24a to have a number of lifting elements 114a, 116a, 118a differing from three.

The lifting elements 114a, 116a, 118a are arranged distributed uniformly in the circumferential direction 100a on the braking element 24a. The lifting elements 114a, 116a, 118a here are formed as a single piece with the braking element 24a. However, it is also conceivable for the lifting elements 114a, 116a, 118a to be formed separately from the braking element 24a and to be connected fixedly to the braking element 24a by means of a type of connection appearing expedient to a person skilled in the art, such as, for example, by means of an interlocking and/or frictional type of connection. The lifting elements 114a, 116a, 118a are formed in a ramp-shaped manner. The lifting elements 114a, 116a, 118a therefore each have a geometrical configuration which, in a fitted state, has a mathematically defined pitch from the braking element 24a in the direction of the driver element 38a, wherein the pitch has a value differing from 0.

The driver element 38a has at least one ramp-shaped braking element movement region 40a, 42a, 44a for interaction with the lifting elements 114a, 116a, 118a of the braking element 24a for producing a movement of the braking element 24a relative to the driver element 38a in the direction of the counterbraking element 120a as a consequence of a rotational movement of the braking element 24a relative to the driver element 38a (FIG. 6). The braking unit 14a therefore comprises at least the driver element 38a which has at least one ramp-shaped braking element movement region 40a, 42a, 44a. Overall, the driver element 38a has three braking element movement regions 40a, 42a, 44a. However, it is also conceivable for the driver element 38a to have a number of braking element movement regions 40a, 42a, 44a differing from three. A number of braking element movement regions 40a, 42a, 44a of the driver element 38a is in particular dependent on a number of lifting elements 114a, 116a, 118a of the braking element 24a, said lifting elements corresponding to the braking element movement regions 40a, 42a, 44a of the driver element 38a. The braking element movement regions 40a, 42a, 44a of the driver element 38a are arranged distributed uniformly in the circumferential direction 100a on the driver element 38a. The braking element movement regions 40a, 42a, 44a here are formed as a single piece with the driver element 38a. However, it is also conceivable for the braking element movement regions 40a, 42a, 44a to be formed separately from the driver element 38a and to be fixedly connected to the driver element 38a by means of a type of connection appearing expedient to a person skilled in the art, such as, for example, an interlocking and/or frictional type of connection.

The braking element movement regions 40a, 42a, 44a have a geometrical configuration which, in a fitted state, has a mathematically defined pitch from the driver element 38a in the direction of the braking element 24a, wherein the pitch has a value differing from 0. The lifting elements 114a, 116a, 118a of the braking element 24a and the braking element movement regions 40a, 42a, 44a together form a movement conversion unit of the braking unit 14a, which is provided for producing a braking force in a braking position of the braking unit 14a in order to move the braking element 24a relative to the driver element 38a by a combination of a rotation and a translation. The braking unit 14a therefore comprises at least the driver element 38a which is provided in order to move a braking element 24a of the braking unit 14a relative to the activating element 22a as a consequence of a rotational movement of the common activating element 22a of the braking unit 14a and of the spindle fixing unit 20a and also of the driver element 38a.

Furthermore, the driver element 38a is provided for moving at least one spindle fixing element 46a, 48a, 50a, 52a, 54a, 56a of the spindle fixing unit 20a relative to the common activating element 22a of the brake unit 14a and of the spindle fixing unit 20a in at least one operating state. The braking unit 14a therefore comprises at least the driver element 38a which is provided for moving at least one spindle fixing element 46a, 48a, 50a, 52a, 54a, 56a of the spindle fixing unit 20a relative to the common activating element 22a of the braking unit 14a and of the spindle fixing unit 20a in at least one operating state. The spindle fixing element 46a, 48a, 50a, 52a, 54a, 56a here is designed as a rolling element. However, it is also conceivable for the spindle fixing element 46a, 48a, 50a, 52a, 54a, 56a to have another configuration appearing expedient to a person skilled in the art. Overall, the spindle fixing unit 20a has six spindle fixing elements 46a, 48a, 50a, 52a, 54a, 56a which have an analogous configuration. In addition, however, it is conceivable for the spindle fixing unit 20a to have a number of spindle fixing elements 46a, 48a, 50a, 52a, 54a, 56a differing from six.

The spindle fixing elements 46a, 48a, 50a, 52a, 54a, 56a are arranged between the driver element 38a and a clamping element 122a of the spindle fixing unit 20a, as viewed in a direction running at least substantially perpendicularly to the axis of rotation 98a of the spindle 16a (FIG. 4). The clamping element 122a here is arranged on the bearing flange 86a for rotation therewith. The clamping element 122a is therefore fixed on the bearing flange 86a so as not to be rotatable relative to the bearing flange 86a. In this case, the clamping element 122a can be fixed to the bearing flange 86a by means of an interlocking, frictional and/or integrally bonded connection. In addition, the clamping element 122a is of annular design. The clamping element 122a therefore surrounds the driver element 38a in the circumferential direction 100a.

Furthermore, the driver element 38a comprises at least one clamping contour 58a, 60a, 62a, 128a, 130a, 132a for clamping at least one of the spindle fixing elements 46a, 48a, 50a, 52a, 54a, 56a of the spindle fixing unit 20a in order to fix the spindle 16a in at least one operating state or in the fixing position of the spindle fixing unit 20a. The braking unit 14a therefore comprises at least the driver element 38a which has at least one clamping contour 58a, 60a, 62a, 128a, 130a, 132a for clamping at least one spindle fixing element 46a, 48a, 50a, 52a, 54a, 56a of the spindle fixing unit 20a. Overall, the driver element 38a has six clamping contours 58a, 60a, 62a, 128a, 130a, 132a. However, it is also conceivable for the driver element 38a to have a number of clamping contours 58a, 60a, 62a, 128a, 130a, 132a differing from six. The clamping contours 58a, 60a, 62a, 128a, 130a, 132a are arranged distributed uniformly in the circumferential direction 100a on the driver element 38a. In this case, the clamping contours 58a, 60a, 62a, 128a, 130a, 132a are arranged on an outer circumference of the driver element 38a, said outer circumference running in the circumferential direction 100a. The clamping contours 58a, 60a, 62a, 128a, 130a, 132a have a ramp-shaped configuration. The clamping contours 58a, 60a, 62a, 128a, 130a, 132a therefore each have a geometrical configuration which has a mathematically defined pitch in the circumferential direction 100a, wherein the pitch has a value differing from 0.

In the event of an interruption to a power supply of the drive unit 82a, such as, for example, as a consequence of an actuation of an operating element 124a (FIG. 1), which is designed as an on/off switch, of the portable power tool 12a, an armature shaft (not illustrated specifically here) of the drive unit 82a is braked as a consequence of an action, already known to a person skilled in the art, of forces and/or torques, such as, for example, of frictional forces and magnetic forces of the drive unit 82a. The output element 66a which is in the form of a ring gear and meshes with the drive element (not illustrated specifically here) of the drive unit 82a, said drive element being arranged on the armature shaft for rotation therewith, the spindle 16a, the machining tool 18a fastened to the spindle 16a, the driver element 38a arranged on the spindle 16a for rotation therewith and the common activating element 22a connected to the output element 66a for rotation therewith, and also the braking element 24a connected to the common activating element 22a for rotation therewith oppose a braking of the armature shaft as a consequence of a mass inertia of the components. The output element 66a, the spindle 16a, the machining tool 18a, the driver element 38a and the common activating element 22a and also the braking element 24a endeavor here to rotate further about the axis of rotation 98a of the spindle 16a as a consequence of a mass inertia of the components.

As a consequence of the drive element of the drive unit 82a meshing with the output element 66a and as a consequence of the rotational play between the driver element 38a arranged on the spindle 16a for rotation therewith and the common activating element 22a arranged on the output element 66a, and also the braking element 24a, the output element 66a and the common activating element 22a and the braking element 24a are rotated relative to the spindle 16a and to the driver element 38a in the event of an interruption to a power supply of the drive unit 82a. The lifting elements 114a, 116a, 118a of the braking element 24a here slide on the braking element movement regions 40a, 42a, 44a of the driver element 38a. In addition to a relative rotational movement, the braking element 24a is moved linearly relative to the driver element 38a in the direction of the counterbraking element 120a by means of an interaction of the lifting elements 114a, 116a, 118a of the braking element 24a and of the braking element movement regions 40a, 42a, 44a of the driver element 38a. By this means, the braking element 24a and the counterbraking element 120a enter into contact, as a result of which, in a braking position of the braking unit 14a, a braking force is produced for braking a rotational movement of the spindle 16a, of the machining tool 18a and of the driver element 38a. The braking unit 14a is therefore in a braking position.

The braking force is produced by means of friction between the braking element 24a and the counterbraking element 120a. In this case, it is conceivable for the braking unit 14a to comprise a heat sink element formed separately from the bearing flange 86a, such as, for example a cooling rib, etc., in order to dissipate frictional heat, or for the bearing flange 86a to be at least partially formed from an advantageous heat-conducting material. In this case, the braking element 24a can carry out a rotational movement relative to the driver element 38a until the coupling regions 26a, 28a, 30a strike against edge regions of the recesses 32a, 34a, 36a of the driver element 38a. The lifting elements 114a, 116a, 118a of the braking element 24a and the braking element movement regions 40a, 42a, 44a of the driver element 38a slide further on one another until the coupling regions 26a, 28a, 30a strike against the edge regions of the recesses 32a, 34a, 36a of the driver element 38a as a consequence of a frictional force between the braking element 24a and the counterbraking element 120a and therefore move the braking element 24a further in the direction of the counterbraking element 120a. As a consequence of the further movement of the braking element 24a in the direction of the counterbraking element 120a, an axial force acting from the braking element 24a on the counterbraking element 120a in the braking position of the braking unit 14a is increased. The increased axial force results in an increase in the braking force. The braking unit 14a therefore has a self-locking function. By this means, the spindle 16a, the machining tool 18a and the driver element 38a and also the armature shaft, the output element 66a, the common activating element 22a and the braking element 24a are braked to a standstill.

If, after the spindle 16a and the machining tool 18a are at a standstill, the spindle 16a is rotated about the axis of rotation 98a of the spindle 16a in order to change a tool, the spindle fixing unit 20a is transferred into the fixing position. In this case, the spindle fixing elements 46a, 48a, 50a, 52a, 54a, 56a are moved relative to the common activating element 22a in a direction running at least substantially perpendicularly to the axis of rotation 98a of the spindle 16a and in the circumferential direction 100a by means of the clamping contours 58a, 60a, 62a, 128a, 130a, 132a of the driver element 38a. By this means, the spindle fixing elements 46a, 48a, 50a, 52a, 54a, 56a are clamped between the clamping contours 58a, 60a, 62a, 128a, 130a, 132a of the driver element 38a and the clamping element 122a. A rotational movement of the spindle 16a is therefore prevented. However, it is also conceivable in this case for the spindle fixing elements 46a, 48a, 50a, 52a, 54a, 56a to each be prestressed by means of a force, in particular a spring force, in the direction of a clamping position and, when a transfer of the spindle fixing unit 20a is activated by means of the common activating element 22a, to be moved into the clamping position as a consequence of the force. When the portable power tool 12a is set into operation, at least one of the spindle fixing elements 46a, 48a, 50a, 52a, 54a, 56a is moved by a drive force acting on the output element 66a as a consequence of a rotation of the common activating element 22a out of a clamping position between the clamping element 122a and the clamping contours 58a, 60a, 62a, 128a, 130a, 132a by means of at least one adjustment element 136a, 138a, 140a of the common activating element 22a. The adjustment element 136a, 138a, 140a is designed as a radial extension. Overall, the common activating element 22a has three adjustment elements 136a, 138a, 140a which have an analogous configuration. The adjustment elements 136a, 138a, 140a are arranged distributed uniformly in the circumferential direction 100a on the common activating element 22a. At least three spindle fixing elements 46a, 48a, 50a, 52a, 54a, 56a are therefore moved by a drive force acting on the output element 66a as a consequence of a rotation of the common activating element 22a out of a clamping position between the clamping element 122a and the clamping contours 58a, 60a, 62a, 128a, 130a, 132a by means of the adjustment elements 136a, 138a, 140a. As a consequence of a rotational movement of the driver element 38a, the remaining spindle fixing elements 46a, 48a, 50a, 52a, 54a, 56a are positioned in a position relative to the clamping element 122a in such a manner that clamping between the clamping element 122a and the clamping contours 58a, 60a, 62a, 128a, 130a, 132a is avoided.

Furthermore, when the portable power tool 12a is set into operation, it is intended to be ensured that the braking element 24a and the counterbraking element 120a are reliably disengaged and contact between the braking element 24a and the counterbraking element 120a is reliably cancelled. For this purpose, the braking unit 14a comprises at least one spring element (not illustrated specifically) which acts upon the braking element 24a with a spring force in the direction of the driver element 38a. However, it is also conceivable for the power tool braking device 10a to comprise at least one movement unit which, in at least one operating state, is provided for moving the braking element 24a in the direction of the driver element 38a at least in order to produce a force component in the direction of the driver element 38a, such as, for example, by means of a cam mechanism, by means of ramp elements which have an opposed pitch to the lifting elements 114a, 116a, 118a, etc.

Figure 3:
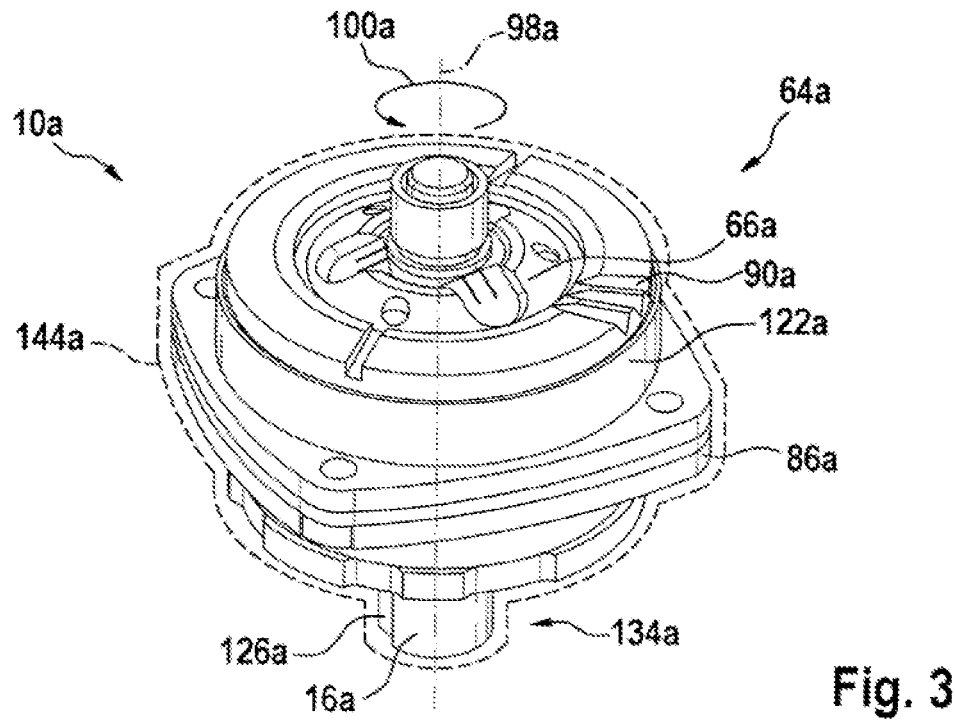
FIG. 3 shows a view of a detail of the power tool braking device according to the disclosure in the form of an installation module, in a schematic illustration.

Furthermore, the power tool braking device 10a is designed as an installation module 144a (FIG. 3). The installation module 144a comprises four fastening elements (not illustrated specifically here) which are designed as screws. The screws are provided for connecting the installation module 144a releasably to the gear housing 74a. When required, an operator can remove the installation module 144a from the gear housing 74a. The portable power tool 12a and the power tool braking device 10a therefore form a power tool system. The power tool system can comprise a further installation module. The further installation module can comprise, for example, an output unit which is designed as an angular mechanism and is formed in a manner decoupled from a braking unit. The further installation module could be fitted, for example by an operator, as an alternative to the installation module 144a to the gear housing 74a. An operator therefore has the possibility of equipping the portable power tool 12a with the installation module 144a or with the further installation module with an output unit which is decoupled from a braking unit. For a use situation in which the portable power tool 12a is intended to be operated in a manner decoupled from the power tool braking device 10a, the installation module 144a can be interchanged for the further installation module of the power tool system by an operator. For this purpose, an operator merely removes the installation module 144a from the gear housing 74a and fits the further installation module to the gear housing 74a.

Figure 8:
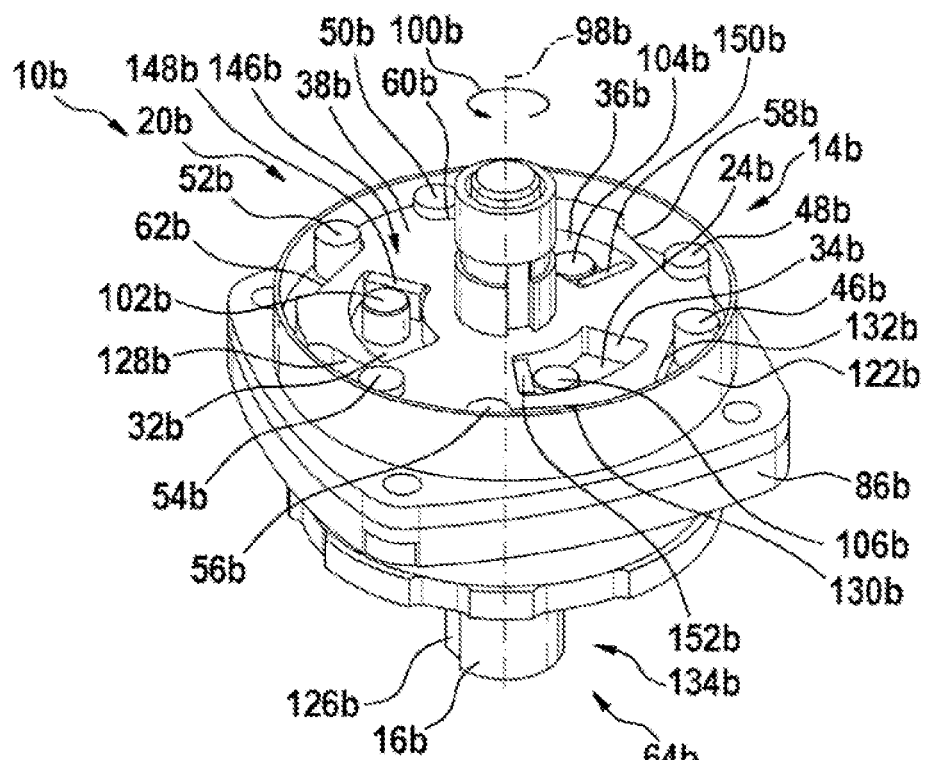
FIG. 8 shows a view of a detail of an alternative power tool braking device according to the disclosure with a removed output element of an output unit of the alternative power tool braking device according to the disclosure, in a schematic illustration.
Figure 9:
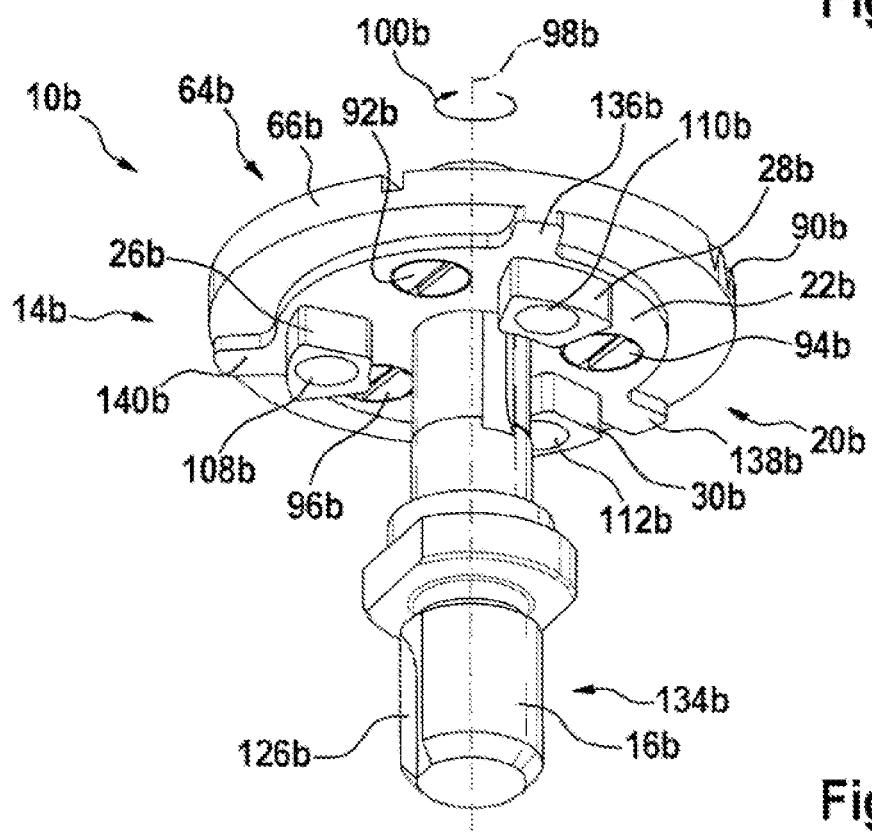
FIG. 9 shows a view of a detail of a common activating element, which is arranged on the output element, of a braking unit and a spindle fixing unit of the alternative power tool braking device according to the disclosure, in a schematic illustration.

FIGS. 8 and 9 illustrate an alternative exemplary embodiment. Components, features and functions substantially remaining the same are basically denoted by the same reference numbers. In order to distinguish between the exemplary embodiments, the letters a and b are added to the reference numbers of the exemplary embodiments. The description below is substantially restricted to the differences over the first exemplary embodiment described in FIGS. 1 to 7, wherein reference can be made to the description of the first exemplary embodiment in FIGS. 1 to 7 with regard to components, features and functions remaining the same.

FIG. 8 shows a power tool braking device 10b which has been removed from a gear housing of a portable power tool (not illustrated specifically here). The power tool braking device 10b here is arrangeable in a portable power tool (not illustrated specifically here) which has an at least substantially analogous configuration to the portable power tool 12a described in FIGS. 1 to 7. The power tool braking device 10b of the portable power tool comprises at least one braking unit 14a for braking a spindle 16b and/or a machining tool (not illustrated specifically here) in at least one braking position of the braking unit 14b, and at least one spindle fixing unit 20b for fixing the spindle 16b in at least one fixing position of the spindle fixing unit 20b. The braking unit 14b and the spindle fixing unit 20b are at least partially formed as a single piece. In comparison to the power tool braking device 10a described in FIGS. 1 to 7, the power tool braking device 10b comprises at least one damping unit 146b for damping torque surges. The damping unit 146b here comprises at least one damping element 148b, 150b, 152b which is provided in order to damp vibrations in an output unit 64b of the power tool braking device 10b. The damping element 148b, 150b, 152b here can be formed from elastomer, from a gel pad with viscous liquid or from another material appearing expedient to a person skilled in the art. The damping unit 146b comprises a total of three damping elements 146b, 150b, 152b. However, it is also conceivable for the damping unit 146b to comprise a number of damping elements 148b, 150b, 152b differing from three. The damping elements 148b, 150b, 152b here are in each case arranged in a recess 32b, 34b, 36b of a driver element 38b of the braking unit 14b. In this case, the damping elements 148b, 150b, 152b are in each case arranged, as viewed in a circumferential direction 100b, between an edge region of the recesses 32b, 34b, 36b and a coupling region 26b, 28b, 30b, which engages in the respective recess 32b, 34b, 36b, of a common activating element 22b of the braking unit 14b and of the spindle fixing unit 20b. In an alternative configuration (not illustrated here) of the power tool braking device 10b, two damping elements 148b, 150b, 152b are in each case arranged in a recess 32b, 34b, 36b, wherein in each case one coupling region 26b, 28b, 30b is arranged between the two damping elements 148b, 150b, 152b in the respective recess 32b, 34b, 36b, as viewed in the circumferential direction 100b. With regard to further features and functions of the power tool braking device 10b, reference should be made to the power tool braking device 10a described in FIGS. 1 to 7.

What is claimed is:

1. A power tool braking device of a portable power tool, comprising:
at least one braking unit configured to brake one or more of a spindle and a machining tool in at least one braking position of the braking unit; and
at least one spindle fixing unit configured to fix the spindle in at least one fixing position of the spindle fixing unit,
wherein the braking unit and the spindle fixing unit include at least one common activating element configured, in at least one operating state, to activate a transfer of the braking unit into the braking position and to activate a transfer of the spindle fixing unit into the fixing position.

2. The power tool braking device according to claim 1, wherein the at least one common activating element is connected to a braking element of the braking unit so as to rotate with said braking element.

3. The power tool braking device according to claim 1, wherein the at least one common activating element has at least one coupling region, the coupling region, in a fitted state, being configured to engage in a recess of a driver element of the braking unit.

4. The power tool braking device according to claim 1, wherein the braking unit comprises at least one driver element configured to move a braking element of the braking unit relative to the activating element in response to a relative movement of the common activating element and also of the driver element.

5. The power tool braking device according to claim 1, wherein the braking unit comprises at least one driver element having at least one ramp-shaped braking element movement region.

6. The power tool braking device according to claim 1, wherein the braking unit comprises at least one driver element configured, in at least one operating state, to move at least one spindle fixing element of the spindle fixing unit relative to the common activating element of the braking unit and of the spindle fixing unit.

7. The power tool braking device according to claim 1, wherein the braking unit comprises at least one driver element having at least one clamping contour configured to clamp at least one spindle fixing element of the spindle fixing unit.

8. The power tool braking device according to claim 1, wherein the spindle fixing unit comprises at least one spindle fixing element configured as a rolling element.

9. The power tool braking device according to claim 1, further comprising at least one output unit including at least one output element, wherein the common activating element is arranged on the output element.

10. A portable power tool, comprising:
at least one power tool braking device including;
at least one braking unit configured to brake one or more of a spindle and a machining tool in at least one braking position of the braking unit; and
at least one spindle fixing unit configured to fix the spindle in at least one fixing position of the spindle fixing unit,
wherein the braking unit and the spindle fixing unit include at least one common activating element configured, in at least one operating state, to activate a transfer of the braking unit into the braking position and to activate a transfer of the spindle fixing unit into the fixing position.

11. The portable power tool according to claim 10, wherein the portable power tool is configured as an angle grinder.

* * * * *